United States Patent [19]
Levitt

[11] 3,763,942
[45] Oct. 9, 1973

[54] AUGER HEAD
[75] Inventor: Merle E. Levitt, Shumway, Ill.
[73] Assignee: Contracting & Material Company, Evanston, Ill.
[22] Filed: Feb. 25, 1972
[21] Appl. No.: 229,410

[52] U.S. Cl............... 175/354, 175/386, 175/391, 175/394
[51] Int. Cl........................ E21b 9/02, E21b 13/04
[58] Field of Search................ 299/86; 175/335, 175/392, 354, 394, 385–388, 391, 397, 398

[56] References Cited
UNITED STATES PATENTS

| 3,388,949 | 6/1968 | Kozar | 175/394 X |
|---|---|---|---|
| 3,467,210 | 9/1969 | Lautsch et al. | 175/386 |
| 3,499,685 | 3/1970 | Kniff | 299/86 |
| 25,896 | 10/1859 | Gordon | 175/385 |
| 2,218,130 | 10/1940 | Court | 175/385 X |
| 2,705,128 | 3/1955 | McClennan | 175/391 |
| 2,749,101 | 6/1956 | Goodrich et al. | 175/392 |
| 2,749,102 | 6/1956 | Goodrich | 175/392 |
| 2,810,566 | 10/1957 | Parsons | 175/392 X |
| 3,693,734 | 9/1972 | Richmond | 175/391 X |
| 2,960,312 | 11/1960 | Kandle | 175/398 X |

Primary Examiner—David H. Brown
Attorney—Benjamin H. Sherman et al.

[57] ABSTRACT

An auger or boring head, especially for horizontal rock and earth drilling having a circular ring of circumferentially spaced tool bits or teeth, a plurality of spokes or fins with leading ends carrying tool bits or cutting teeth in convex curved or arcuate contours from a central cutting point forwardly of the ring to the periphery of the ring. The cutting teeth on the ring project radially outward from the periphery thereof and are tilted forwardly in the direction of rotation of the auger head. The cutting teeth on the spokes or fins project forwardly, are tilted toward the direction of rotation of the head and are also tilted backwardly to present the tip end of each tooth in a straight forward direction to the surface which it is cutting. In addition, the teeth are staggered so that successive teeth will not have the same cutting track. A head or socket is provided in the center of the auger head for connection to a drill rod or stem. Large open areas are provided through the ring between the spokes or fins, and the earth or rock cut by the head is free to flow through these spaces to a spiral conveyor which preferably has it leading edge behind one of the spokes or fins.

10 Claims, 9 Drawing Figures

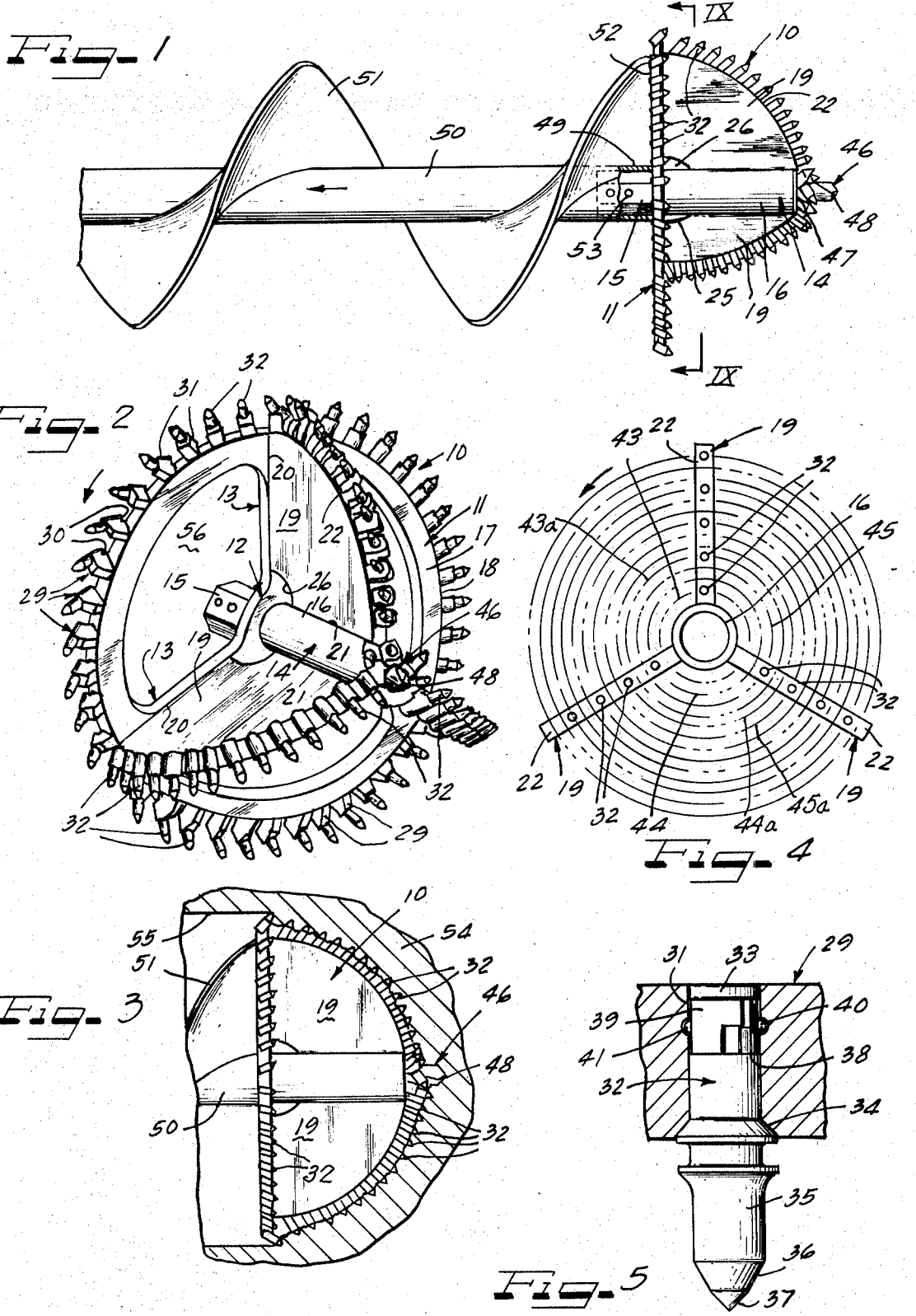

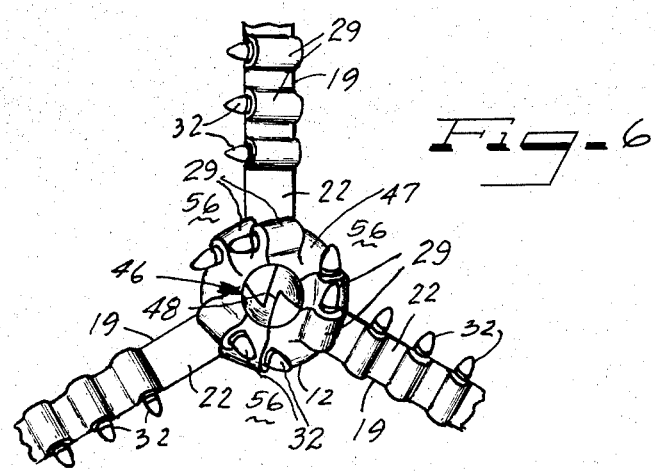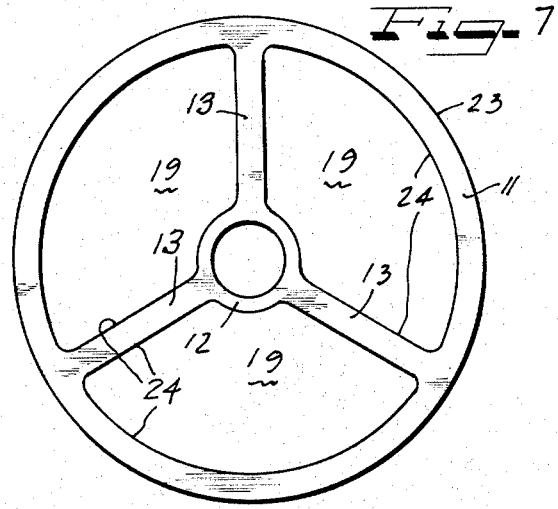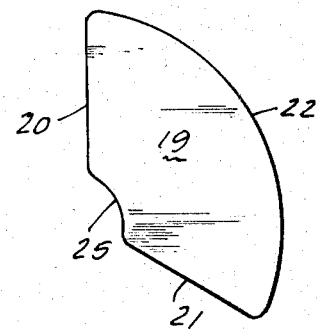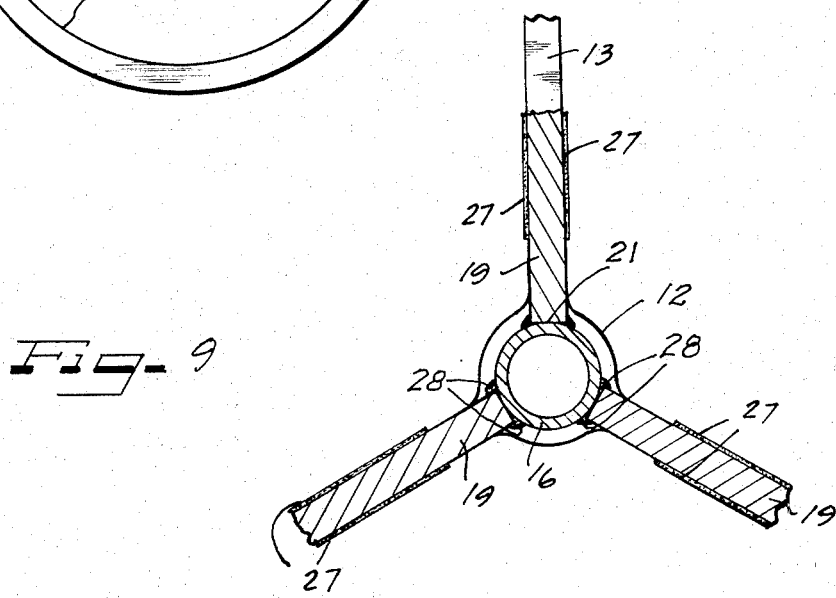

AUGER HEAD

BACKGROUND OF THE INVENTION

Field of the Invention

This invention relates to the art of boring or drilling rock or earth with an auger head having a plurality of cutting teeth and particularly deals with an auger head having the cutting teeth arranged for most efficient drilling or boring.

SUMMARY OF THE INVENTION

This invention provides an auger or boring head, especially for horizontal rock and earth drilling. The head has a body with a cylindrical rim, a plurality, preferably three, equally spaced radial spokes, a central hub with a head projecting rearwardly for attachment to a drill rod or stem and a shaft projecting forwardly with a drill point on the leading end thereof. Fin quadrants or nose pieces radiate from the hub to the rim and project axially forward from the spokes to present bowed or convex arcuate, preferably segmental circular, leading end edges extending from the drill point to the periphery of the rim. The periphery of the rim and the leading arcuate end edges of the fins or nose pieces have a plurality of spaced tool bit sockets secured thereon with each socket rotatably supporting a stud-type tool bit with a carbide tip. The sockets are circumferentially spaced around the periphery of the rim and positioned to project the tool bits radially outward and forward from the rim as well as inclined toward the direction of rotation of the head. The sockets on the leading end edges of the fins or nose pieces are so mounted as to project the tool bits axially forward and tilted toward the direction of rotation of the head with successive bits tilted progressively backward defining a helical flute contour along the length of the arc from the drill point to the rim. This presents the cutting tips of the tool bits normal to the surface being cut for the most effective cutting action. In addition, the sockets are so spaced that the cutting tips on the successive nose pieces will be offset from the cutting tracks of the preceding bits. The arcuate leading ends of the fins or nose pieces provide spans of increased lengths accommodating the mounting of more tool bits than could be accommodated by straight line leading edges. Further, the arcuate arrangement of the tool bits prevents wedging of the auger head in the hole being drilled while at the same time continuing to center the head in the hole.

It is then an object of this invention to provide an auger or boring head especially for horizontal rock and earth drilling which will present a large number of individual cutting teeth to the rock or earth in the most efficient manner and will accommodate free removal of the cut material.

Another object of this invention is to provide an auger head with a circular rim of cutting teeth, a central hub adapted to be connected to a drill stem and a plurality of spokes connecting the hub and rim and carrying cutting teeth in arcuate paths from a central cutting point to the rim.

Another object of this invention is to provide an auger head with a plurality of individual rotatably mounted carbide tool bits arranged in arcuate paths from a central cutting point to a circular rim and also projecting radially around the rim.

Another object of the invention is to provide a horizontal boring head with individual sockets for stud-like cutting bits arranged to project the bits so that their cutting points will engage the material being drilled in a most efficient manner and will present a larger number of cutting bits to the material being drilled without wedging into the material.

Another object of the invention is to provide a rock-drilling auger presenting more rotating tool bits to the work than available heretofore.

Another object of the invention is to provide a rock-drilling auger head with a large number of individual replaceable rotating tool bit studs so positioned in individual rows so that they will not jam in operation.

Other and further objects of this invention will become apparent to those skilled in this art from the following detailed description of the annexed sheets of drawings which by way of a preferred example illustrate one embodiment of the invention and wherein:

FIG. 1 is a side elevational view of an auger head of this invention mounted on a conveyor slight equipped drill rod.

FIG. 2 is a perspective view of the auger head of FIG. 1.

FIG. 3 is a fragmentary side view with parts in section showing the manner in which the auger head of this invention cuts into rock or earth during a cutting or boring operation.

FIG. 4 is a somewhat diagrammatic front view of the auger head of this invention showing the manner in which the tool bits on the radiating nose pieces are in staggered relation so as not to cut in the same track.

FIG. 5 is an enlarged elevational view of a tool bit or tooth section showing the manner in which the teeth of the auger head of this invention are replaceable and rotatably mounted.

FIG. 6 is a partial front elevational view of the auger head.

FIG. 7 is a plan view of a metal disk showing the manner in which the body or frame of the auger head of this invention is formed.

FIG. 8 is a plan view of one of the fins or nose pieces for the auger head of this invention cut from the disk of FIG. 7.

FIG. 9 is a cross sectional view taken generally along the line IX—IX of FIG. 1.

DESCRIPTION OF THE PREFERRED EMBODIMENT

The auger or boring head 10 of this invention as shown in FIG. 1 2 and 7 has a metal frame or body with a circular rim 11, a central hub 12, three radial spokes 13, spaced equally apart in 120° relation, connecting the rim and hub, a central hollow shaft 14 extending through the hub 12 and having a hexagonal head portion 15 projecting rearwardly of the hub and an axially elongated cylindrical portion 16 projecting forwardly of the hub. The rim 11, hub 12, and spokes 13 present a flat front face 17 lying in a single plane, and the shaft 14 projects through the hub on both sides of this plane providing the axially elongated cylindrical portion 16 projecting forwardly and the hexagonal head portion 15 projecting rearwardly. The rim 11 has a circular peripheral edge 18.

An axially extending radial fin or nose piece 19 is welded on the front face 17 of each spoke 13 and the rim 11 and is also welded on the cylindrical portion 16 of the shaft 14. Each fin is cut to a 90° segment from a one-third pie-shaped segment of a circular disk and has one flat edge 20 thereof welded to the front face 17 and radially outward from the shaft portion 16 in 120° spaced apart relation. Each nose piece 19 has a circular arc front edge 22 extending from the front end of the shaft portion 16 to the periphery 18 of the rim 11.

As shown in FIG. 7 and 8, the body of the auger head 10 providing the rim 11, the hub 12 the spokes 13 and the nose pieces 19 may conveniently be formed from a single circular steel disk 23 of sufficient thickness to provide adequate strength and rigidity for the frame or body of a diameter to control the bore diameter of the hole to be drilled by the auger head. The metal disk 23 as shown in FIG. 7 is cut by a saw or torch along the lines 24 thereby providing the three fins or nose pieces 19 and leaving the rim 11, hub 12, and spokes 13.

Each fin or nose piece as shown in FIG. 8 will have straight line edges 20 and 21. One edge 20 remains intact and the other edge 21 is cut back to 90° relationship with the edge 20. The edge 20 and the cut back edge 21 are positioned for welding to a spoke 13 and the shaft portion 16 and, of course, will have the circular arc edge 22 extending from the forward end of the shaft portion 16 to the periphery 18 of the rim 11. The radial inner edge 25 of the nose piece 19 will also be arcuate to leave the hub portion 12 intact and will leave an open space 26 in the corner between the shaft portion 16 and the hub 12, as shown in FIGS. 1 and 2.

As shown in FIG. 9, weld bonds 27 secure the edges 20 of the nose pieces 19 to the spokes 13, and weld bonds 28 secure the edges 21 of the nose pieces to the shaft portion 16.

As shown in FIGS. 2 and 5, the periphery 18 of the rim 11 has a large number of tool bit sockets 29 welded thereon in equal circumferentially spaced relation. Each socket 29 has a block-like base 30 with a hollow head portion 31 providing a cylindrical bore therethrough receiving a stud-like tool bit 32.

Each tool bit 32 as shown in FIG. 5 has a cylindrical shank portion 33 fitting freely in the hollow head 31 and having a tapered load-carrying head 34 seating in a counterbore of the hollow head 31, together with a projecting head portion 35 with a tapered end 36 tipped by a tungsten carbide point or tooth 37. The shank 33 has a reduced diameter portion 38 near its free end receiving a spring sleeve 39 with a bead 40 adapted to be snapped into a groove 41 in the bore of the housing head 31. In this manner the tool bits or teeth 32 are rotatably mounted in their sockets 29 and can be replaced when broken or when the cutting tip ends 37 thereof are worn.

The sockets 29 are so positioned on the periphery 18 of the rim 11 as to present the tool bit studs 32 forwardly of the front face 17 of the rim and radially outwardly from the periphery 18 of the rim, as well as toward the direction of rotation of the auger head. The tool bits preferably project outwardly and forwardly at an angle of about 22° and tilt toward the direction of rotation of the auger head at an angle of about 30°. This presents the tip ends 37 of the tool bits to the rock or earth being drilled at the most efficient cutting angle and causes the tool bits 32 to rotate about their own axes as the auger head is rotated about its axis.

The arcuate leading edges 22 of the fins or nose pieces 19 also have tool bit sockets 29 welded thereon in spaced relation along the entire length of the arc from the leading end of the shaft portion 16 to the rim 11. These sockets 29 varry the same tool bits 32 as described above and are positioned in staggered relation on the successive edges 22 so that each tool bit will cut its own path in the rock or earth being drilled. Thus as shown diagrammatically in FIG. 4, the tool bits 32 on the successive nose pieces 19 are offset from each other so that the first or innermost tool bit 32 in one nose piece 19 will cut on a circular path 43, the innermost tool bit on the next successive nose piece will cut on a circular path 44 outwardly from the path 43 and the inner tool bit on the next nose piece 19 will cut in a circular path 45 outwardly from the path 44. Then the second tool bit on the one nose piece will cut on a circular path 43a outwardly from the path 45, the second tool bit on the following nose piece will cut on a circular path 44a outwardly from the path 43a and so on. In this manner, each tool bit does its own work on a separate cutting track.

In addition, the sockets 29 carry the The bits so that they project axially forward from the edges 22 of the nose pieces 19 and tilt toward the direction of rotation with greater tilt at the inner tool bits. Thus a gradual back tilting is provided as the tool bits progress radially outward to the periphery of the auger head. This back tilting presents the tip edges 37 of the tool bits in a straight-forward direction to the rock or earth being drilled with the leading teeth projecting forwardly and the trailing teeth tilting back in an outward direction. A helical flute or screw-like action is thereby obtained. The purpose of this tilting is to provide the most efficient cutting action with the tips of the tool bits always engaging the rock or earth along their cutting tapered sides causing the tool bits to rotate. The tilt-back feature merges the axial forward projection of the leading end teeth with the radial projection of the trailing end teeth so that when the teeth on the rim come into action the cuts they make will be blended into the cuts made by the immediately forward teeth. The rim teeth, of course, produce the final diameter of the bore.

A cutting point or head 46 is mounted on the leading end of the shaft portion 16 and, as shown in FIG. 6, has a base or head 47 welded to the shaft portion 16, a removable central twisted drill point 48 providing the leading end of the auger head and a plurality of surrounding cutting bit sockets 29 with the cutting bits 32 presented to engage the rock or earth immediately surrounding the point 48. This drill point unit 46 can be replaced with any desired type of centering point.

As shown in FIG. 1, the hexagonal head 15 of the central hub shaft 14 receives thereon the hexagonal socket hollow end 49 of a flight conveyor equipped drill rod or stem 50 having a spiral conveyor 51 removing the drilled material rearwardly from the cutting head 10 in the direction of the arrow. The leading edge 52 of the conveyor 51 is aligned with one of the spokes 13 of the auger head. A knock-out pin mounting 53 can be provided to unite the head 15 of the auger head with the drill stem 50.

As shown somewhat diagrammatically in FIG. 3, the auger head 10 of this invention first engages dirt or rock 54 at the drill point 48 and then the tool bit 32 immediately surrounding this auger point 48 enlarge the small hole made by the points to merge into the constantly enlarging hole cut by the tool bits on the nose pieces 19. Because these tool bits on the nose pieces 19 are arranged in arcuate paths diverging from the point 48 to the rim of the auger head, more tool bits can be accommodated than could be placed along a straight diverging edge from the cutting point to the rim. As a result, increased cutting capacity is obtained and at the same time any wedging action is prevented because of the gradual rounded contour cut by the successive arcuately disposed bits. The cylindrical bore 55 thus formed in the rock or earth 54 is brought to its finished diameter by the tool bits teeth on the periphery 18 of the rim of the auger head and the tool bits on the nose pieces cut gradually and successively into the earth or rock in progressively increasing numbers as the diameter of the hole increases.

Wide open spaces 56 (FIGS. 2 and 6) are provided between the nose pieces and the spokes on which they are mounted so that the cut material is free to flow into the spiral conveyor 51 and be conveyed away from the auger head. Three nose pieces 19 and spokes 13 are especially suitable to provide open flow paths for the cut material and at the same time afford sufficient strength for the body of the auger head.

The auger heads of this invention may be made to cut holes of any desired diameter as, for example, from 3 to 4 feet. In such size units, the central shaft 14 can conveniently be about 5 inches in diameter and project about 22 inches forwardly from the hub to provde the lead from the cutting point 48 to the rim 11. In one tested unit of this invention for cutting 36-inch holes, 41 cutting teeth spaced about 1 ½ inches apart were provided on the rim 11, 12 cutting teeth were provided on two of the nose pieces 19 and 13 cutting teeth were provided on the third nose piece 19. The rim teeth were tilted toward the direction of rotation of the unit at an angle of 30° and were outturned at an angle of about 20°.

From the above descriptions it will be clear that this invention now provides an improved auger or boring head which presents individual cutting teeth to rock or earth being drilled in the most sufficient manner to feed the head forwardly and present an increased number of cutting teeth to the work in a progressive manner as the hole is enlarged while at the same time affording free removal of the drilled material rearwardly from the head. The rim and arcuate nose body portions of the auger head of this invention afford mountings for the largest number of cutting teeth without impairing removal of the drilled material away from the auger head.

I claim as my invention:

1. An auger head especially adapted for horizontal boring which comprises a body adapted to be attached to a drill shaft and having a central drill shaft receiving portion, a circular rim surrounding said portion in spaced relation, fins connecting said portion and rim and projecting forwardly from the rim with convex curved leading edges converging in a bowed path from the rim to said portion, a drill point on the leading end of the central portion, and cutting teeth mounted on the rim and leading edges of the fins and projecting therefrom to engage earth and rock material to be drilled progressively from said drill point to the periphery of said rim.

2. The auger head of claim 1 wherein the body has a central hub and spokes connecting the hub and rim with open spaces therebetween.

3. An auger head especially adapted for horizontal boring which comprises a body having a hub, a rim surrounding the hub in spaced concentric relation, spaced spoke members connecting the hub and rim and having convex curved leading end edges projecting axially from the rim to the hub, and cutting teeth mounted on the rim and convex curved leading end edges of the spoke members.

4. The auger head of claim 3 wherein the spaced spoke members have axial fins projecting forwardly therefrom providing the convex curved leading end edges.

5. The auger head of claim 3 wherein the body has a circular rim and three equally spaced spoke members.

6. The auger head of claim 3 wherein the cutting teeth are rotatable studs with hard cutting tip ends.

7. An auger head comprising a body having a central hub, three equally spaced spokes radiating from the hub, a rim carried by and surrounding the spokes, a central shaft projecting through the hub having a rear end for attachment to a drill stem and an elongated forwardly projecting portion, axial fins secured to the spokes and elongated shaft portion presenting convex curved leading edges diverging from the shaft to the rim, a drill point on the leading end of the shaft, cutting teeth spaced circumferentially around the rim and projecting forwardly and outwardly from the rim in the direction of rotation of the head, spaced cutting teeth on the convex curved leading edges of the axial fins projecting forwardly and tilted in the direction of rotation of the head, the leading teeth on said curved leading edges of the fins being tilted forwardly in the direction of rotation of the head more than the trailing teeth to provide a screw vane cutting effect, and said teeth on the rim and fins being rotatably mounted.

8. The auger head of claim 7 wherein the teeth are rotatable and removable.

9. An auger head comprising a rigid body having a circular rim, a central rear head for attachment to a drill stem, a central front drill point forwardly of the rim, a plurality of members presenting leading end edges diverging in convex curved paths from the point to the rim, open spaces between the rim and drill point for free flow of drilled material, and a plurality of cutting bits mounted on the rim and leading end edges of the members in spaced relation.

10. The auger head of claim 9 wherein the cutting bits are rotatable studs with hard cutting points.

* * * * *